July 2, 1957  W. H. THURSTON  2,798,197
MICROWAVE BRIDGE

Filed Nov. 16, 1953  2 Sheets—Sheet 1

Inventor: William H. Thurston
By
His Attorney

United States Patent Office 2,798,197
Patented July 2, 1957

2,798,197

MICROWAVE BRIDGE

William H. Thurston, Orinda, Calif., assignor to Shell Development Company, Emeryville, Calif., a corporation of Delaware Application November 16, 1953, Serial No. 392,288

8 Claims. (Cl. 324—58.5)

This invention relates to dielectric measurements and pertains more particularly to a system for effecting such measurements by the use of signal energies having wavelengths of the microwave order.

Methods have been proposed, notably in U. S. Letters Patent No. 2,611,804 to Zaleski, to effect dielectric measurements by directing microwave energy through a hollow wave guide upon a dielectric material and measuring the amounts of energy absorbed, reflected or transmitted by this material, said amounts being indicative of the dielectric properties of the material.

These methods are however subject to several drawbacks. First, they often require a sample of considerable size or volume, whereas particularly in the production of new compounds, plastics, etc. only very minute quantities of such material may be available. Second, these methods do not permit to distinguish between amplitude and phase change, and thus cannot be used to measure both the real and the imaginary components of dielectric constants. Third, these methods are suitable chiefly for laboratory and not for field or industrial use, such for example, as the measurement of the degree of emulsification of fluids in refinery or cross-country pipe lines.

It is therefore an object of this invention to provide a microwave measuring system eliminating the above drawbacks by the use of a microwave bridge having a sample arm adapted to be positioned adjacent the sample and a reference arm adapted to compensate bridge unbalance due to the presence of the sample or to a change in the dielectric properties thereof.

It is also an object of this invention to provide a microwave bridge for the study of materials such as catalysts, plastics, emulsions or any polar-nonpolar mixtures, and the like, said apparatus having a sample arm adapted to probe the material to be tested and a reference arm capable of synthetically duplicating the reflection and absorption properties of said materials to give null readings of extremely high accuracy.

It is also an object of this invention to provide a microwave bridge having a reference arm adapted to compensate separately for amplitude and phase changes of the waves traveling in the sample arm of said bridge, whereby both the real and the imaginary components of the dielectric constant of the sample can be determined.

It is also an object of this invention to provide a microwave bridge especially suitable for field use, wherein the material under test does not have to be confined within the wave guide structure of the sample arm, but the desired measurements can readily be carried out merely by positioning said sample arm adjacent said test material.

These and other objects of this invention will be understood from the following description taken with reference to the attached drawings, wherein.

In general, the unbalance of the present microwave bridge may be said to have two components corresponding to the amplitude and phase unbalance of an ordinary A. C. bridge upon the introduction of a complex impedance, except that in the case of the microwave bridge the dielectric impedance to be dealt with is describable in terms of its complex dielectric constant, i. e., in terms of the notation:

$$e = e_0 k (1 - j \tan \delta)$$

wherein $e$ is the true complex dielectric constant of the material; $e_0$ is the non-complex dielectric constant of free space; $k$ is the specific inductive capacity of the material (usually referred to simply as its dielectric constant); and tan $\delta$ is the loss tangent, or the measure of the energy absorbed by the sample and dissipated as heat. It must be particularly noted that while the quantity tan $\delta$ causes the amplitude or attenuation unbalance of the bridge, $k$ is related to the phase unbalance that arises from the decrease in wave velocity of the micro-waves being propagated through the material.

It follows from the above that a true and accurate measurement of the complex quantity $e$ necessarily requires that both components thereof, which are functions of the factors tan $\delta$ and $k$ respectively, be independently measured. This is effected, according to this invention, by providing a microwave bridge with calibrated means for independently compensating the bridge for unbalance due to attenuation and for unbalance due to phase shift, whereby null readings giving a true measure of the complex dielectric constant of the material under test are obtained.

Figures 1, 2:
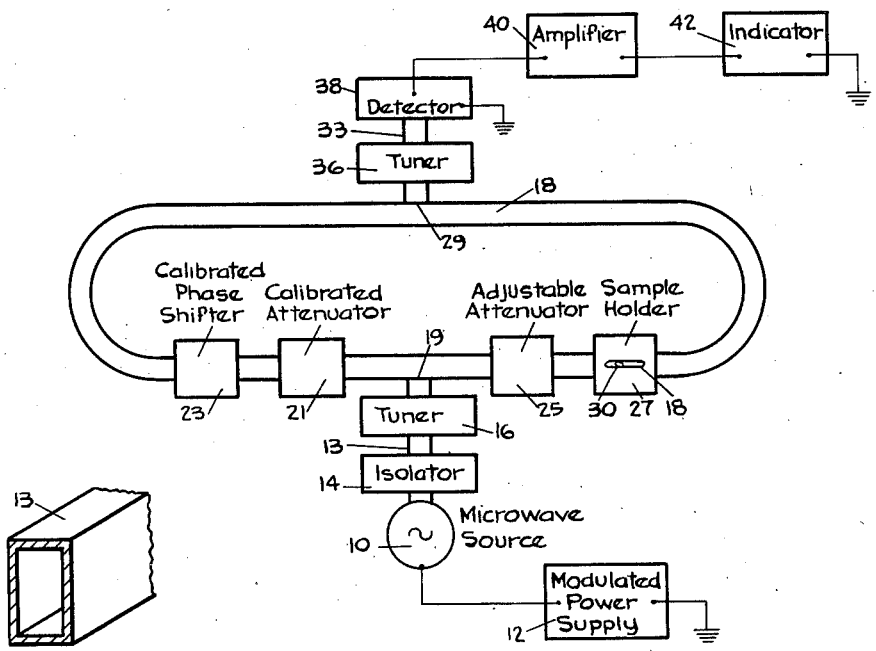
Fig. 1 is a diagram of one embodiment of the present system.
Fig. 2 is a diagrammatic cross-section view of a waveguide conductor.

Fig. 1 shows one arrangement of apparatus suitable for the purposes of the present invention.

A microwave source 10, such as a klystron type oscillator is energized by a power supply 12, preferably modulated at some audio-frequency such as from 1 to 10 kilocycles. The source 10 oscillates at a very high frequency of the order of from 3000 to 100,000 megacycles producing microwaves having a length in the range of from 10 cm. to 3 mm. These oscillations are fed to a wave-guide 13 and preferably pass through an isolator 14 adapted to protect the operation of the oscillator from disturbances which may be caused by reflected energy. The isolator 14 may advantageously be a Faraday rotator involving the use of iron and magnesium oxides (known as ferrites) having high specific rotation powers for electro-magnetic waves. The wave-guide 13, whose cross-section is shown in Fig. 2, is provided with a tuner device 16 serving to optimize the energy transfer from the microwave source to the bridge 18. Any suitable type of tuner may be used, such as a E–H tuner, a stub, double-stub or triple-stub tuner, a slide-screw tuner, etc. The bridge 18 is shown in Fig. 1 as consisting of a loop preferably made of the same wave-guide material as the element 13, to which it is connected at 19 by a series-T (wide side of the wave-guide) or a shunt-T (narrow side) connection.

The left-hand side of the bridge 18 forms the reference arm thereof and is provided with a calibrated attenuator 21 and a calibrated phase shifter 23. The structure of these devices is well known, and it is therefore sufficient to say that they may conveniently consist of thin strips adjustably positioned within the wave-guide conductors, and made of suitable materials, such for example as graphite for the attenuator 21 and metal or silvered glass for the phase shifter 23.

The right-hand side of the bridge 18 forms the sample arm thereof and carries an adjustable attenuator 25, which cooperates with the calibrated attenuator to provide unbalance compensation for any possible set of operating conditions. This is necessary since the calibrated attenuator 21, even when given its minimum operative setting, still has a small attenuating effect. The sample arm also carries a sample holder 27, which may be of any desired construction, and may consist in its simplest form of a slot 28 in the upper face of the wave-guide member. The sample under test may be introduced into this slot in shapes or containers of any desired form. The sensitivity of the present bridge is sufficiently high to permit extremely small samples to be tested. Thus, it is possible to test liquids introduced into the slot 28 in containers 30 such as small cylinders made of glass or any plastic or synthetic materials and having an axial length of approximately ½ inch, a diameter of 0.1 inch and a wall thickness of a few thousandths of an inch.

At a point 29, symmetrical with the connection point 19, where the two bridge arms merge together, a connection, similar to 19, is made to a wave-guide member 33 carrying a tuner 36 serving to insure optimum energy transmission to a detector 38, which may be any desired type, such for example as a crystal detector.

The output of the detector 38 is supplied to a galvanometer, or preferably, as shown in the drawing, to an amplifier 40, which is preferably tuned to the modulating frequency of the power supply source 12, whereby high sensitivity is achieved. The output of the amplifier 40 is delivered to a suitable indicating device 42 such as a vacuum tube volt meter, an oscilloscope, etc.

Figure 3:
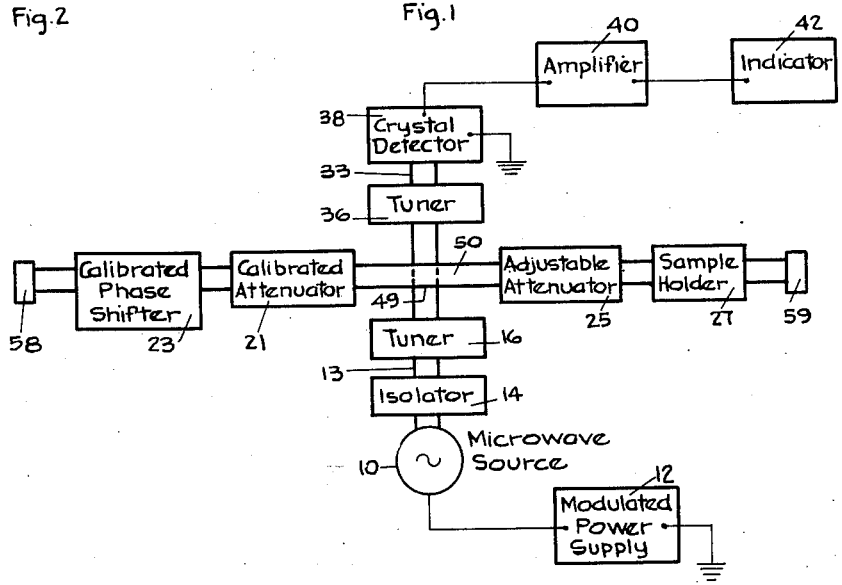
Figs. 3 and 4 are diagrams of two other embodiments of the present system.

Fig. 3 shows an embodiment of the present bridge slightly different from that shown in Fig. 1. This system comprises a source 10 feeding a wave-guide 13 through an isolator 14 and a tuner 16 in a manner identical with Fig. 1. The arms of the bridge of Fig. 3, however, are not arranged to form a loop as in Fig. 1, but consist of a single member or length of a wave-guide conductor 50 connected by means of a hybrid-T connection at approximately mid-point to the wave-guide member 13, as indicated at 49. The left-hand or reference arm of the bridge 50 is provided with the calibrated attenuator 21 and calibrated phase shifter 23, while its right arm has an adjustable attenuator 25 and sample holder 27, also similar to those of Fig. 1. The two arms of the bridge 50 are terminated at their outer ends by "shorts" or reflectors 58 and 59, serving to reflect the microwave energy arriving thereto. In some cases, it may be desirable to replace these reflector terminations with loss-type terminations such as diagrammatically shown at 61 and 69 in Fig. 4, as will be described hereinbelow.

The portion of the system of Fig. 3 comprising the indicator 42 and related devices is similar to the corresponding portion described with regard to Fig. 1. It is understood that although the arms of the present bridge are shown located in one plane, such is not the actual arrangement used. Thus, if the sample and reference arms in Fig. 3 are disposed along the X-axis, and the wave-guide member 13 lies along the Y-axis, the arm 33 of the crystal detector 38 must be located along the Z-axis, at right angles to each of the other two arms, being attached to the members 50 and 13 by a so-called "hybrid-T" connection, well known in the art.

Figure 4:
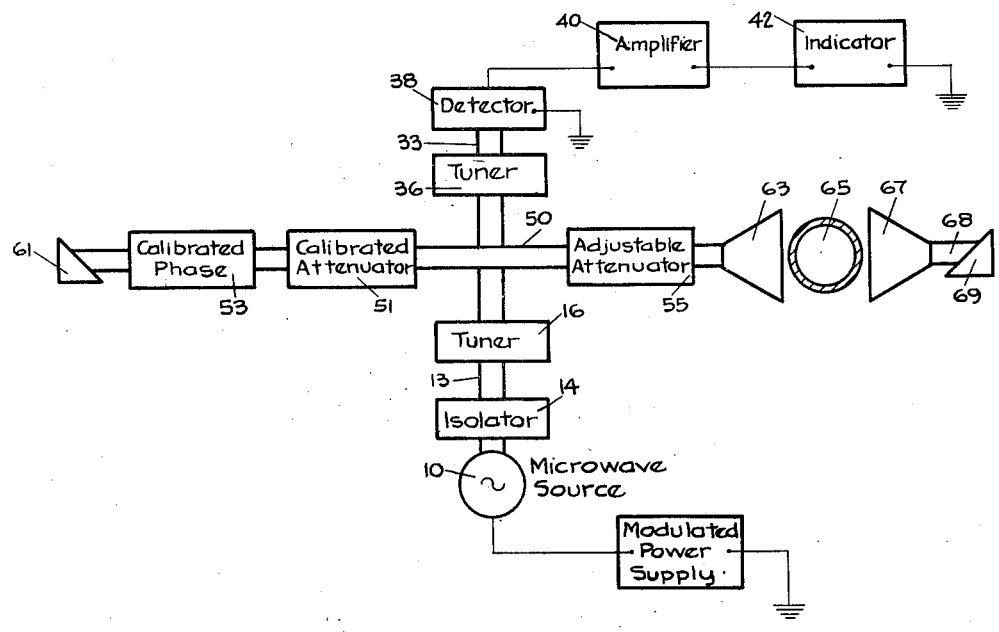

Fig. 4 shows a modification of the system of Fig. 3 for use when it is desired to measure the complex dielectric constant of a fluid or an emulsion flowing in a pipe, the same elements being denoted by the same numerals as in Fig. 3.

The reference arm of the bridge is preferably provided with a loss-type termination diagrammatically shown at 61. In the sample arm, the sample holder 57 is replaced by a transmitter horn 63, similar, for example, to those used at focal points of parabolic antennas. The horn 63 is placed substantially adjacent a section 65 of a pipe carrying the fluid to be tested, said particular pipe section being preferably made of plastic or other suitable material readily penetrated by microwave energy. A receiving horn 67 is placed on the other side of the pipe 65 and has the function of receiving microwaves transmitted through the fluid in pipe 65 and feeding them confined within a wave-guide 68 to a loss-type terminal 69 to place under control the reflections traveling back to the bridge.

The operation of the present system is substantially identical for all the embodiments shown in the drawings. After a sample is inserted in sample holder 27, or the horns 63—67 are positioned near the pipe line 65, or any other fluid filled vessel, microwave energy of the desired frequency is supplied to the present bridge by the source 10, a part thereof going to the reference arm and a part to the sample arm. The energy passing through the sample is attenuated and its velocity is decreased, as in the case of refraction phenomena, in a manner and to an extent which are functions of the complex dielectric constant of the sample material. The microwaves reaching the junction point 29 through the sample arm of Fig. 1 differ therefor both in amplitude and in phase from the microwaves reaching said point through the reference arm. The bridge is thus in a condition of unbalance which is sensed by the detector and indicator units. This unbalance is corrected or compensated for by proper manipulation of the calibrated attenuator and phase shifter units in the reference arm of the bridge, that is, the attenuator and phase shifter units are used to produce synthetically in the reference arm microwave absorption, reflection and transmission effects and conditions duplicating those due to the presence of the sample in the sample arm, whereby the system is rebalanced, or brought to a condition of minimum unbalance, and a null or substantially null reading is obtained.

The systems of Figs. 3 and 4 operate in essentially the same manner as that of Fig. 1. In either case the microwave energy entering the reference arm and the sample arm is reflected by the reflectors 58 and 59 respectively, a pattern of standing waves being set up in the wave guide 59. Attenuation and phase shift effects due to the sample are detected by the detector 38 and balanced out as before to obtain a null reading. The same is true when loss-type terminations such as diagrammatically shown at 61 in Fig. 4 are used instead of reflectors. The sensitivity of the present bridge system being very high, no great phase or amplitude disturbances are desired, and the amounts of energy reflected by the sample alone, when loss-type terminations are used, are quite adequate to give significant readings while increasing the overall accuracy of the system.

I claim as my invention:

1. A microwave bridge system for determining the dielectric properties of a fluid flowing in a pipe, said system comprising a bridge having a reference arm and a sample arm formed of wave-guide means, a calibrated wave amplitude attenuator and a calibrated phase shifter connected to the reference arm, said reference arm having a loss-type termination, an adjustable attenuator connected to the sample arm, an energy transmitting member connected to the sample arm, said member being adapted to be disposed adjacent to the pipe carrying said fluid, an energy receiving member comprising a loss-type termination disposed symmetrically with said energy transmitting member on the diametrically opposite side of said fluid carrying pipe, a generator of microwave energy, means connecting the output of said generator to said bridge intermediate said bridge arms, a microwave energy detector, means connecting said detector to said bridge symmetrically with said generator, and microwave energy indicating means having the input thereof connected to said detector.

2. The bridge of claim 1, wherein the reference arm and the sample arm are provided with reflection-type terminations.

3. The bridge of claim 1, wherein the means connecting the generator of microwave energy to the bridge comprise isolator means preventing reflected energy from passing back to said generator.

4. The bridge of claim 1, wherein the wave-guide means connecting the generator of microwave energy and the microwave energy detector to the bridge are each provided with tuner means adapted to optimize energy transfer through said wave-guide means.

5. A microwave bridge system for measuring properties of a dielectric material, said system comprising a reference arm and a sample arm formed of wave-guide means, a calibrated wave amplitude attenuator and a calibrated phase shifter connected to the reference arm, said reference arm having a loss-type termination, an adjustable attenuator connected to the sample arm, an energy transmitting member connected to the sample arm, said member being adapted to be disposed adjacent to the dielectric material to be tested, an energy receiving member comprising a loss-type termination disposed symmetrically with said energy transmitting member on the diametrically opposite side of said dielectric material, a generator of microwave energy, means connecting the output of said generator to said bridge intermediate said arms, a microwave energy detector, means connecting said detector to said bridge symmetrically with said generator, and microwave energy indicating means having the input thereof connected to said detector.

6. The bridge of claim 5, wherein the reference arm and the sample arm are provided with reflection-type terminations.

7. A microwave bridge system for measuring properties of a dielectric material, said system comprising a reference arm and a sample arm formed of wave-guide means, a calibrated wave amplitude attenuator and a calibrated phase shifter connected to the reference arm, said reference arm having a loss-type termination, an adjustable attenuator connected to the sample arm, an energy transmitting member connected to the sample arm, said member being adapted to be disposed adjacent to the dielectric material to be tested, an energy receiving member comprising a loss-type termination disposed with respect to said energy transmitting member on the other side of said dielectric material, a generator of microwave energy, means connecting the output of said generator to said bridge intermediate said arms, a microwave energy detector, means connecting said detector to said bridge symmetrically with said generator, and microwave energy indicating means having the input thereof connected to said detector.

8. The bridge of claim 7, wherein the reference arm and the sample arm are provided with reflection-type terminations.

References Cited in the file of this patent

UNITED STATES PATENTS

| | | |
|---|---|---|
| 2,416,790 | Barrow | Mar. 4, 1947 |
| 2,596,288 | Robertson | May 13, 1952 |
| 2,630,475 | Woodward | Mar. 3, 1953 |
| 2,659,860 | Breazeale | Nov. 17, 1953 |
| 2,666,132 | Barrow | Jan. 12, 1954 |
| 2,697,208 | Houghton | Dec. 14, 1954 |

OTHER REFERENCES

Kyhl: Abstract of application Serial Number 580,014, published Feb. 21, 1950, 631 O. G. 883.